United States Patent [19]

Thadani et al.

[11] Patent Number: 5,648,965
[45] Date of Patent: Jul. 15, 1997

[54] METHOD AND APPARATUS FOR DYNAMIC DISTRIBUTED PACKET TRACING AND ANALYSIS

[75] Inventors: Moti N. Thadani, Santa Clara; Jose M. Bernabeu-Auban; Yousef A. Khalidi, both of Sunnyvale; Vladimir Matena, Redwood City; Kenneth W. Shirriff, Mountain View, all of Calif.

[73] Assignee: Sun Microsystems, Inc., Mountain View, Calif.

[21] Appl. No.: 499,275

[22] Filed: Jul. 7, 1995

[51] Int. Cl.$^6$ .................. H04L 12/26; H04J 3/14
[52] U.S. Cl. .................. 370/241; 370/912; 395/200.11
[58] Field of Search .................. 370/13, 13.1, 14, 370/17, 94.1, 110.1, 94.3; 395/200.11; 379/6; 348/5.5

[56] References Cited

U.S. PATENT DOCUMENTS

| | | | |
|---|---|---|---|
| 4,760,570 | 7/1988 | Acampora et al. | 370/94.1 |
| 5,247,517 | 9/1993 | Ross et al. | 370/17 |
| 5,274,631 | 12/1993 | Bhardwaj | 370/94.1 |
| 5,343,463 | 8/1994 | Van Tetering et al. | 370/13 |
| 5,434,976 | 7/1995 | Tan et al. | 395/200.11 |

*Primary Examiner*—Douglas W. Olms
*Assistant Examiner*—Matthew C. Phillips
*Attorney, Agent, or Firm*—Blakely Sokoloff Taylor & Zafman

[57] ABSTRACT

A packet filter can be programmed by a remote controller to detect packets meeting a particular criterion and to report detection of these packets to the controller. The reports from the packet filter are collected and analyzed by the remote controller. A streams module that incorporates the packet filter is used within a Solaris operating system environment that has been enhanced to support an object framework. The streams module exports a programming interface to the packet filter defined in an interface definition language (IDL). The streams module can be pushed onto a network device in a similar fashion to other streams modules. The streams module responds to requests from one remote controller or to requests from more than one remote controller. These remote controller requests arrive as remote procedure call (RPC) requests on the IDL object references exported by the module. The packet filter within the streams module is fully programmable, and it collects and returns information to the controller through a call back object on the controller. The particular traces collected can be configured dynamically by the controller, by issuing RPC requests to the packet filters through the IDL interfaces. Alternately, a standard Solaris environment can be used. In such a case, a standard (i.e., non-object oriented) RPC approach is employed. Furthermore, the above approach will work with other UNIX systems that support stream modules. Moreover, because other operating systems have streams-like input/output capabilities, the approach can be extended to non-UNIX systems such as DOS, Windows NT, OS/2 Warp or the Macintosh operating system.

16 Claims, 3 Drawing Sheets

CONTROLLER
300

PROGRAMMER
310

COLLECTOR
320

ANALYZER
330

*Figure 3*

METHOD AND APPARATUS FOR DYNAMIC DISTRIBUTED PACKET TRACING AND ANALYSIS

BACKGROUND OF THE INVENTION

1. Field of the Invention

The present invention relates to the field of computer systems. More specifically, the present invention relates to tracing and analysis of network packets in a computer network.

2. Art Background

The ability to trace network packets in a distributed computer system network is very important. It is also important to be able to analyze the resulting network packet traces. Such analysis can be used for evaluating the performance of the network, or to debug applications running on various nodes in the network. The analysis can also be used to examine the correctness of a protocol when a new protocol is being developed.

It is not particularly difficult to capture and analyze network packets in a distributed network connected using a shared media network, e.g., an Ethernet network. A packet analyzing computer can be connected to the shared medium and can monitor the network traffic through the shared medium. Because all of the network traffic is carried by the shared medium, the packet analyzer can be set to collect information regarding the network traffic, or to collect information regarding a portion of the network traffic that is of interest.

There is no easy way, however, to capture and analyze the network packets in a distributed system connected through a non-shared media network, e.g., an Asynchronous Transfer Mode (ATM) network. A typical non-shared media network is configured using a "hub and spoke" topology wherein a central switch at the "hub" is used to establish separate point-to-point connections between individual pairs of nodes, with each node being located on a different "spoke". More complex networks are then formed by connecting together the central switches of two or more hubs. In this way, a point-to-point connection between nodes belonging to two different hubs can be established.

There are several possible ways to capture and analyze the network packets in a distributed system connected through a non-shared media network, but none of the current approaches is satisfactory.

One approach is to modify the operating system on one or more nodes so that the operating system will collect the data. This approach is difficult because the network may contain nodes that are using different operating systems. Each operating system has its own internal interface and structure that would have to be modified in an ad hoc fashion specific to that particular operating system. Furthermore, if one were to modify the operating system for a particular node, then one could only observe the traffic that is directed to that particular node, or traffic that originates from that particular node. Typically, however, one desires to collect information about traffic beyond the traffic of a single node. Under this approach, one would have to independently modify the operating system of each node of interest, get the data collected at each node and then merge the data manually to get a picture of what happened in real time. Besides being difficult to implement and maintain, this approach may not be practical because nodes of interest may be separated by miles, or even located on different continents.

Another approach is to modify one or more switch by adding some software or hardware, or both, so that the switch will intercept and collect packets. This solution is also not practical because switches are manufactured by different vendors and are hard to modify. Typically, each vendor has its own proprietary software, and does not provide software hooks that would be necessary to gain access to the desired data. Furthermore, a network can contain multiple switches manufactured by multiple vendors, with each switch of interest requiring modification. Moreover, when multiple switches are involved in a huge network, one must collect from multiple switches and then splice the collected information together in order to form a picture of what is going on inside of the network.

A final approach is that one can somehow splice or tap into each wire of interest. This approach also is practically infeasible. Furthermore, to study traffic of more than one node, multiple taps are required. Moreover, when multiple taps are involved, one must collect data from the multiple taps and then splice the collected information together for analysis.

SUMMARY OF THE INVENTION

Dynamic distributed packet analysis is provided by a packet filter that is programmed by a remote controller to detect packets meeting a particular criterion and to report detection of these packets to the controller. The reports from the packet filter are collected and analyzed by the remote controller. A streams module that incorporates the packet filter is used within a Solaris operating system environment that has been enhanced to support an object framework. The streams module exports a programming interface to the packet filter defined in an interface definition language (IDL). The streams module can be pushed onto a network device in a similar fashion to other streams modules. The streams module responds to requests from one remote controller or to requests from more than one remote controller. These remote controller requests arrive as remote procedure call (RPC) requests on the IDL object references exported by the module. The packet filter within the streams module is fully programmable, and it collects and returns information to the controller through a call back object on the controller. The particular traces collected can be configured dynamically by the controller, by issuing RPC requests to the packet filters through the IDL interfaces.

Alternately, a standard Solaris environment can be used. In such a case, a standard (i.e., non-object oriented) RPC approach is employed. Furthermore, the above approach will work with other UNIX systems that support stream modules.

Moreover, because other operating systems have streams-like input/output capabilities, the approach can be extended to non-UNIX systems such as DOS, Windows NT, OS/2 Warp or the Macintosh operating system.

BRIEF DESCRIPTION OF THE DRAWINGS

The objects, features, and advantages of the method and apparatus of the present invention will be apparent from the following detailed description of the invention in which.

DETAILED DESCRIPTION OF THE INVENTION

A method and apparatus for dynamic distributed packet tracing and analysis is described. In the following description, for purposes of explanation, numerous details are set forth such as specific bit values, message paths, word sizes, etc., in order to provide a thorough understanding of the present invention. It will be apparent, however, to one skilled in the art that such specific details are not essential to the practice of the present invention. In particular, although the present invention will be described within a specific network system, it will be appreciated that the present invention is in no way limited to this particular system. As will be appreciated, the present invention finds application in any network system requiring tracing and analysis of network packets. In the description which follows, reference will be made to figures in which well known electrical structures and circuits are shown in block diagram form in order not to obscure the present invention unnecessarily.

Figure 1:
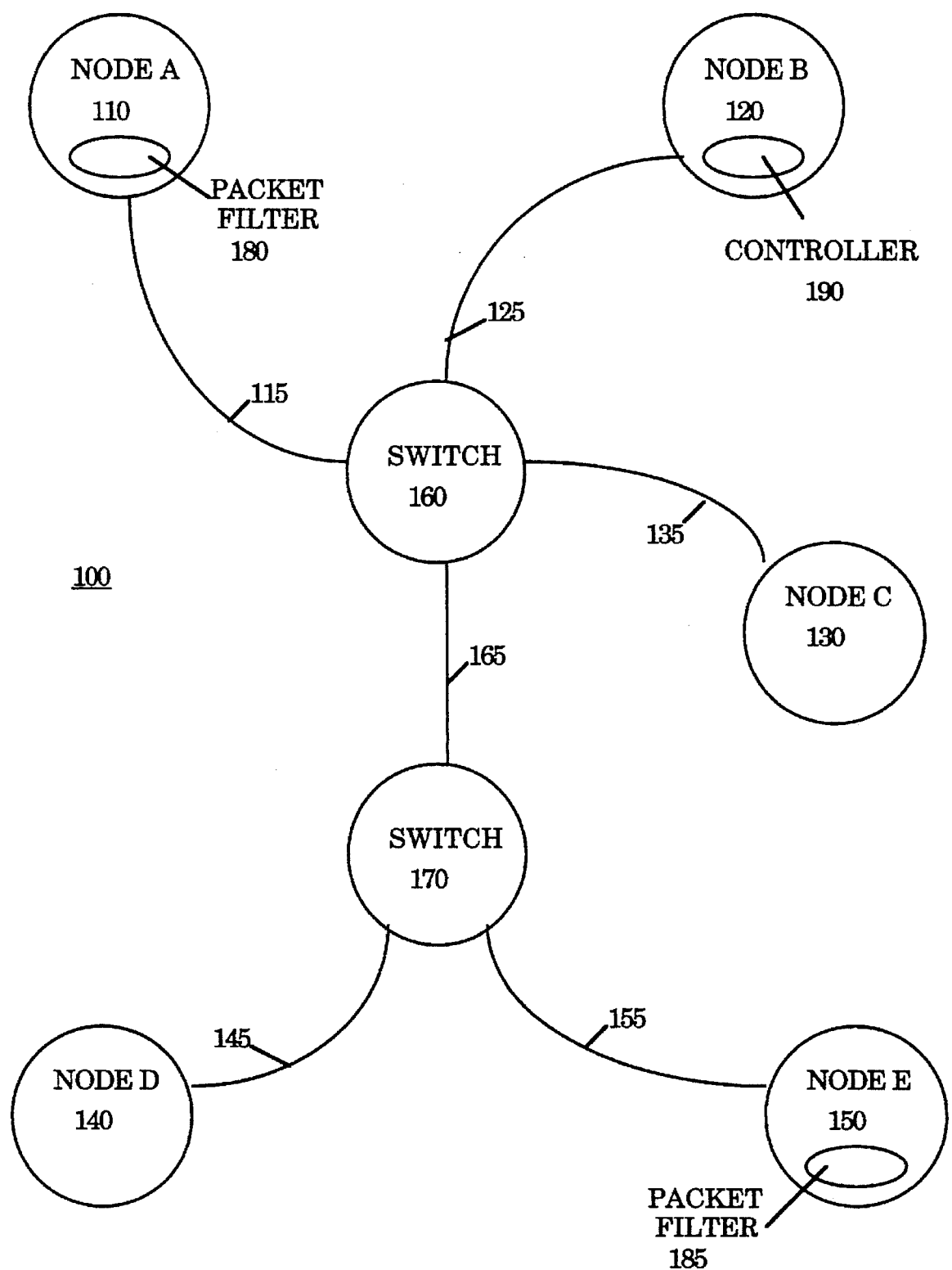
FIG. 1 illustrates a non-shared media network having a remotely programmable packet filter and a controller.

FIG. 1 illustrates a non-shared media network having a remotely programmable packet filter and a controller. Network 100 of FIG. 1 is formed from two hub and spoke networks. The first hub and spoke network has switch 160 at its hub and, as its spokes, has Nodes A 110, B 120 and C 130 coupled by links 115, 125 and 135, respectively. The second hub and spoke network has switch 170 at its hub and, as its spokes, has Nodes D 140 and E 150 coupled by links 145 and 155, respectively. Link 165 in turn, couples together the first and second hub and spoke networks, by coupling together switches 160 and 170.

In FIG. 1, links 115, 125, 135, 145 and 155 each represent a non-shared network media. Switches 160 and 170 cooperate to establish point-to-point connections between any two nodes of network 100. Inter-node communication across the point-to-point connections is accomplished through the transmission and reception of packets.

Each node of network 100 can be a single processor computer, a co-processor computer or a multiple computer system. In the case wherein a node is formed from multiple computers, the computers can be of the same type, or the node can be formed from two or more types of computers.

Nodes A 110 and E 150 of network 100 include packet filters 180 and 185, respectively. A packet filter is typically a small body of code installed by user programs at or close to a network interrupt handler of an operating system kernel. In prior art, a packet filter is intended to carry an incoming packet up to its next logical level of demultiplexing through a user-level process. Usually, an operating system implements an interpreter that applies installed filters against incoming network packets in their order of arrival. If the filter accepts the packet, the kernel sends the packet to its recipient address space. Two types of packet filters are common: a CSU/Stanford packet filter (CSPF) and a BSD packet filter (BPF). CSPF is based on a stack machine. A CSPF can push data from an input packet, execute ALU functions, branch forward and accept or reject a packet. BPF is a more recent packet filter mechanism which, instead of being stack-based, is register-based. BPF programs can access two registers, as well as an input packet and a scratch memory. They execute load, store, ALU and branch instructions, as well as a return instruction that can specify the size of the packet to be delivered to the target endpoint.

With a microkernel, where traditional operating system services such as protocol processing are implemented outside the kernel, the original packet filter provided a convenient mechanism to route packets from the kernel to a dedicated protocol server. Typically two packet filters would ever be installed on a machine (i.e., one to recognize IP (Internet Protocol) traffic and one to recognize all other traffic). Further information regarding packet filters, including example packet filter programs can be found, for example, in the article "Efficient Packet Demultiplexing for Multiple Endpoints and Large Messages", Masanobu Yuhara, et al., Winter Usenix, 1994.

In contrast to prior art packet filters, in network 100, controller 190, located on node 120, can be used to remotely program packet filter 180 of node A 110. Controller 190 can also be used to remotely program packet filter 185 of node E 150. Also in contrast to prior art packet filters, although packet filters 180 and 190 can be used in the traditional manner, they can also be programmed to aid in the tracing of packets through network 100. Thus, for example, controller 190 can be used to program packet filter 180 to recognize receipt at node A 110 of a packet from node E 150. Furthermore, controller 190 can be used to program packet filter 180 to report to controller 190 the transmission from node A 110 of a packet to node E 150. This report can then be collected and analyzed by controller 190.

Similarly, controller 190 can be used to program packet filter 185 to recognize transmission of a packet from node E 150 to node A 110. Controller 190 can also be used to program packet filter 185 to report to controller 190 receipt of a packet at node E 150 from node A 110. This report can also then be collected and analyzed by controller 190.

In the above example, if Node E 150 were to transmit one or more packets to Node A 110, one or more packet transmission reports would be issued from packet filter 185 to collector 190. In the case where all of the packets sent from Node E 150 packets were received by node A 110, one or more packet reception reports would be sent from node A 110 to controller 190. Controller 190 could then be used to perform an analysis of the reports collected. For example, the transmission and reception reports could be compared to verify that all of the packets sent from node E 150 were received by node A 110. If the reports include the transmission and reception times, it would be possible to determine transmission time through network 100 from node E 150 to node A 110. In the case of multiple packet transmissions, statistical analysis could be performed to calculate mean, mode, median transmission times, standard deviations, and the like.

It would also be possible to determine cases where a packet was sent from node E 150, but was never received by node A 110. This is because a transmission report would be made by node E 150, but there would be no corresponding reception report at node A 110.

Similarly, packet filters 180 and 185 can be programmed to report the type of packet traffic between nodes A 110 and E 150. Thus, it may be the case that a packet transmitted from node E 150 is corrupted by the time it is received at node A 110. In such a case, node A 110 will request that node E 150 retransmit the corrupted packet. By reporting this information to controller 190, an analysis can be performed to determine the nature of traffic between the two nodes.

In the case where packets are being corrupted, packet filter 180 and 185 can be programmed to report the actual packets transmitted and received between nodes A 110 and E 150. By reporting this information to controller 190, an analysis can be performed to determine the nature of corruption of packets for traffic between the two nodes.

Thus, controller 190 can be used to program packet filters 180 and 185, to coordinate the collection of packet trace data, and to analyze the packet trace data collected. This can be accomplished without modifying the operating system kernel nodes A 110 and E 150, without modifying switches 160 and 170 and without tapping into links 115, 165 or 155.

Similarly, controller 190 can be used to remotely program packet filters (not shown) located on nodes C 130 and D 140. Controller 190 can also be used to locally program a packet filter (not shown) co-located with controller 190 on node B 120. Thus controller 190 can be used to program packet filters on any node of network 100 to recognize a trace packet, i.e., a packet meeting a particular criterion. Furthermore, controller 190 can be used to program packet filters on any node of network 100 to report recognition of the trace packet to controller 190. These reports can then be stored and analyzed by controller 190. Because of the flexibility of the packet filters, the actual criterion used to specify a trace packet, and the information reported to the controller by the packet filter can be tailored to meet the specific needs of the analysis to be performed on the network.

For one embodiment, a streams module (see "AT&T Streams Reference", AT&T, 1990) that incorporates a packet filter is used within a Solaris operating system environment. For this embodiment, the Solaris environment has been enhanced to support an object framework. The streams module exports a programming interface to the packet filter defined in interface definition language (IDL). The streams module can be pushed onto a network device in a similar fashion to other streams modules. The streams module responds to requests from one remote controller or to requests from more than one remote controller. These remote controller requests arrive as remote procedure call (RPC) requests on the IDL object references exported by the module. The packet filter within the streams module is fully programmable, and it collects and returns information to the controller through a call back object on the controller. The remote controller makes an interface, or "hook", available to the reporter of the packet filter. Because the reporter has a reference handle of the call back object, the repeater can invoke a RPC on callback and send information to the collector of the controller. The particular traces collected can be configured dynamically by the controller, by issuing RPC requests to the packet filters through the IDL interfaces.

Alternately, a standard Solaris environment can be used. In such a case, a standard (i.e., non-object oriented) RPC approach is employed.

Furthermore, the above approach will work with other UNIX systems that support stream modules. Moreover, because other operating systems have streams-like input/output capabilities, the approach can be extended to non-UNIX systems such as DOS, Windows NT, OS/2 Warp or the Macintosh operating system.

Figure 2:
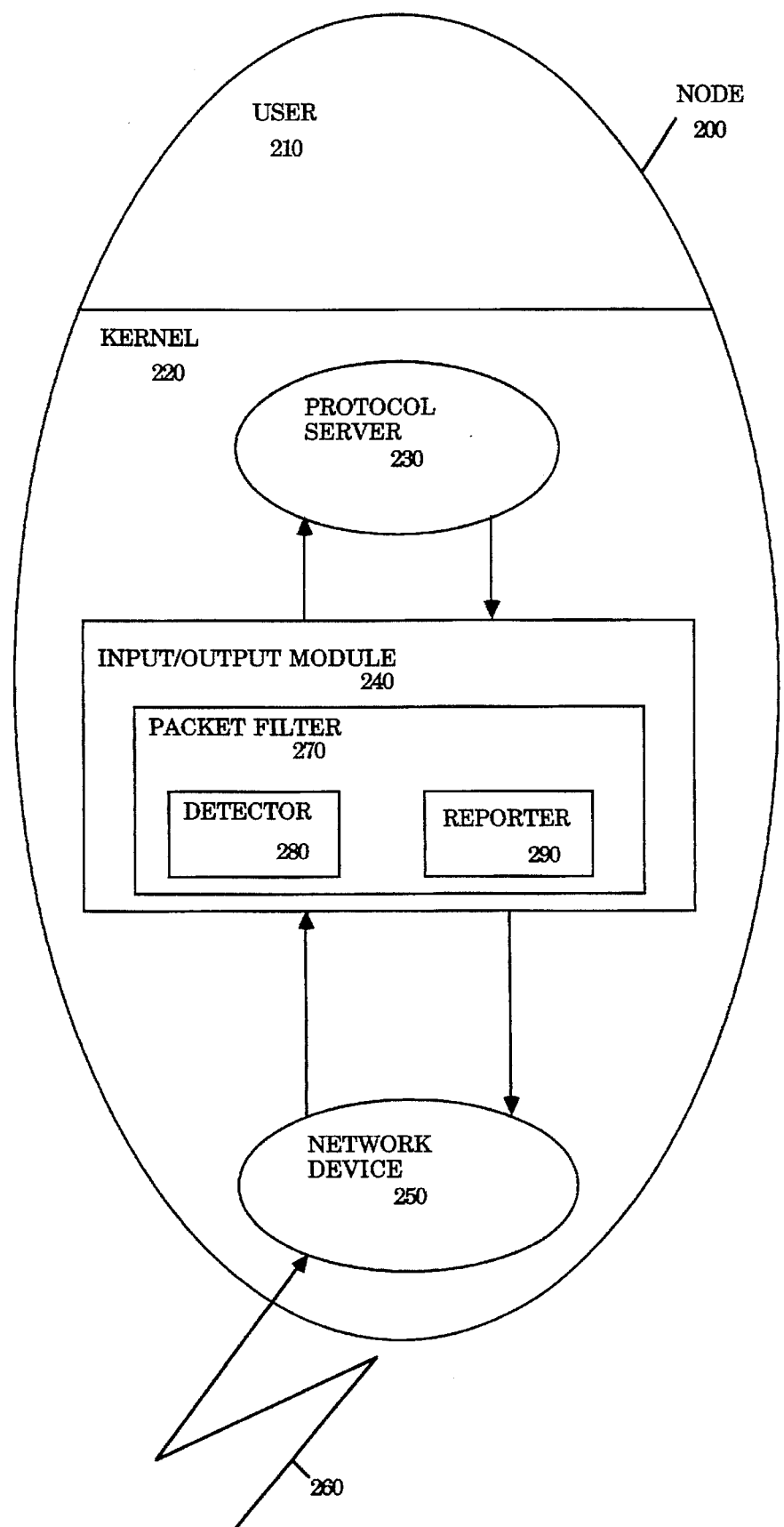
FIG. 2 illustrates a network node that includes a remotely programmable packet filter having a trace packet detector and a reporter to report detection of the trace packet; and, FIG. 3 illustrates a controller having programming, collection and analysis modules.

FIG. 2 illustrates a network node that includes a remotely programmable packet filter having a trace packet detector and a reporter to report detection of the trace packet. In FIG. 2, node 200 is coupled to network link 260 through network device 250. Node 200 is divided into user 210 and kernel 220. Thus, kernel 220 could be a Solaris kernel, for example. Network packets enter and leave node 200 through network device 250. Within the kernel 220, a packet originating from node 200 will be transferred from protocol server 230 to network device 250 through input/output module 240. On the other hand, a packet entering node 200 will be transferred from network device 250 to protocol server 230 through input/output module 240.

For one embodiment, protocol server 230 is comprised of internet protocol (IP) and a transport control protocol (TCP) layers. Alternately, however, other protocols such as AppleTalk, IPX or OSI can be employed. Similarly, for one embodiment, input/output module 240 is a streams module. Other input/output modules, however, can be alternately employed.

Packet filter 270 is one component of input/output module 240. Packet filter 270 is programmable and has been programmed to include detector 280 and reporter 290. Detector 280 of packet filter 270 can examine every packet that enters or leaves node 200 through network device 260. When detector 280 detects a packet that satisfies a particular criterion, e.g., the fifth packet to be sent to a particular node, reporter 290 will generate a report of the event. This report can then be collected and analyzed.

FIG. 3 illustrates a controller having programming, collection and analysis modules. In FIG. 3, controller 300 includes programmer 310 collector 320 and analyzer 330.

As discussed previously, programmer 310 is used to program local or remote packet filters. A local packet filter is a packet filter located on the same node as programmer 310. A remote packet filter, on the other hand, is a packet filter located on a different node than programmer 310. Programmer 310 can be used to program the packet filters to detect packets meeting a particular criterion. Programmer 310 can also be used to program packet filters to report to collector 320 when a packet meeting a specified criterion has been detected.

Collector 320 receives and stores reports from packet filters. For one embodiment collector 320 is a call back object. Analyzer 330, in turn, is used to analyze the trace reports collected by collector 320. Analyzer 330 represents any of a broad class of distributed debugging tools. These distributed debugging tools are commercially available and permit one to visualize the occurrence of events within a network system. Examples of such tools include Snoop and NetMetrics analysis tools.

Although FIG. 3 depicts an embodiment wherein programming, collection and analysis are performed from the same controller on the same node, this need not be the case. Thus, for example, programming could be performed using a controller on a first node, collection could be performed using a collector on a second node and analysis could be performed using an analyzer of a third node. Of course, in the case where multiple controllers are used, each controller need only have a programming, collection or analysis capability if that capability is required.

Although the present invention has been particularly described with reference to FIGS. 1 through 3, it should be understood that these figures are for illustration only and should not be taken as limitations upon the invention. In particular, although the present invention has been described as advantageously implemented in non-shared media networks, the above described programmable packet filters can also be utilized in shared media networks. It is further contemplated that many changes and modifications may be made to the invention, by one of ordinary skill in the art, without departing from the spirit and scope of the invention as disclosed herein.

What is claimed is:

1. A packet filter comprising:
    a remotely-programmable packet criterion detector, located in a first node, to detect receipt of a trace packet, the trace packet meeting a criterion programmed by a remote controller located in a second node; and
    a reporter to report the detection of the trace packet to a packet information collector said packet information collector receiving and storing a report of the detection of the trace packet.

2. The packet filter as set forth in claim 1, wherein the packet information collector is a call back object.

3. The packet filter as set forth in claim 1, wherein an analyzer is used to analyze packet information reported by the packet filter and collected by the packet information collector.

4. The packet filter as set forth in claim 1, wherein a programmer is used to program the packet criterion detector and thereby establish the criterion.

5. The packet filter as set forth in claim 4, wherein the packet filter is located on a first node of a network and the programmer is located on a second node of the network.

6. A packet filter comprising:

a remotely-programmable packet criterion detector to detect receipt of a trace packet, the trace packet meeting a criterion programed by a remote controller; and a reporter to report the detection of the trace packet to a packet information collector said packet information collector receiving and storing a report of the detection of the trace packet, said packet information collector being a call back object.

7. The packet filter as set forth in claim 6, wherein an analyzer is used to analyze packet information reported by the packet filter and collected by the packet information collector.

8. A packet filter comprising:

a remotely-programmable packet criterion detector to detect receipt of a trace packet, the trace packet meeting a criterion;

a reporter to report the detection of the trace packet; and wherein a programmer is used to program the packet criterion detector, and the packet filter is located on a first node of a network and the programmer is located on a second node of the network.

9. A packet tracing method comprising the steps of:

detecting receipt of a trace packet by a packet filter, the trace packet meeting a criterion;

reporting the detection of the trace packet; and using a packet information collector to receive and store the report of the detection of the trace packet, wherein the packet information collector is a call back object.

10. The packet tracing method as set forth in claim 9, further including the step of:

analyzing packet information reported by the packet filter and collected by the packet information collector.

11. A packet tracing method comprising the steps of:

detecting receipt of a trace packet by a packet filter, the trace packet meeting a criterion;

reporting the detection of the trace packet; and programing the packet criterion detector, wherein the packet filter is located on a first node of a network and the programming is performed from a second node of the network.

12. A system comprising:

a first packet filter to detect and report receipt of a first trace packet, the first trace packet meeting a first criterion;

a second packet filter to detect and report receipt of a second trace packet, the second trace packet meeting a second criterion; and a packet information collector, to receive and store the report of the detection of the first and second trace packets.

13. The system as set forth in claim 12, further comprising:

a programmer to program the first packet filter to thereby establish the first criterion.

14. The system as set forth in claim 13, further comprising:

a first node, the first packet filter being located on the first node; and a second node, the programmer being located on the second node.

15. The system as set forth in claim 14, further comprising:

an analyzer to analyze the packet information collected by the packet information collector.

16. A system comprising:

a first packet filter to detect and report receipt of a first trace packet, the first trace packet meeting a first criterion;

a second packet filter to detect and report receipt of a second trace packet, the second trace packet meeting a second criterion;

a packet information collector to receive and store the report of the detection of the first trace packet;

a first node, the first packet filter being located on the first node;

a second node, the second packet filter being located on the second node; and a point-to-point network coupling the first and second nodes and used to send the trace packets between the first and second nodes.

* * * * *